(12) United States Patent
Vuong et al.

(10) Patent No.: US 8,401,548 B2
(45) Date of Patent: *Mar. 19, 2013

(54) METHOD FOR SCANNING WIRELESS FREQUENCIES

(75) Inventors: Thanh Vinh Vuong, Waterloo (CA); Nicholas Alfano, Stratford-Upon Avon (GB)

(73) Assignee: Research In Motion Limited, Waterloo (CA)

( * ) Notice: Subject to any disclaimer, the term of this patent is extended or adjusted under 35 U.S.C. 154(b) by 385 days.

This patent is subject to a terminal disclaimer.

(21) Appl. No.: 12/368,368

(22) Filed: Feb. 10, 2009

(65) Prior Publication Data

US 2009/0149176 A1 Jun. 11, 2009

Related U.S. Application Data

(63) Continuation of application No. 11/083,477, filed on Mar. 18, 2005, now Pat. No. 7,509,125.

(51) Int. Cl.
*H04W 4/00* (2009.01)
*H04W 74/00* (2009.01)
*H04B 1/18* (2006.01)

(52) U.S. Cl. .......... 455/434; 455/455; 455/161.1

(58) Field of Classification Search .......... 455/62, 455/161.1, 161.2, 161.3, 435.1, 435.2, 445, 455/450, 456.1, 452.1, 452.2, 443, 455
See application file for complete search history.

(56) References Cited

U.S. PATENT DOCUMENTS

| | | | | |
|---|---|---|---|---|
| 6,144,916 | A | * | 11/2000 | Wood et al. ............ 701/200 |
| 6,167,268 | A | | 12/2000 | Souissi et al. |
| 6,223,042 | B1 | * | 4/2001 | Raffel ............ 455/455 |
| 6,397,064 | B1 | | 5/2002 | Bridges et al. |
| 6,564,055 | B1 | | 5/2003 | Hronek |
| 6,807,163 | B1 | * | 10/2004 | Shi ............ 370/337 |
| 6,901,264 | B2 | | 5/2005 | Myr |
| 6,941,120 | B2 | * | 9/2005 | Barnett et al. ............ 455/164.2 |
| 7,840,341 | B1 | * | 11/2010 | Sato et al. ............ 701/202 |
| 2004/0218605 | A1 | | 11/2004 | Gustafsson et al. |
| 2005/0113089 | A1 | * | 5/2005 | Bamburak et al. ............ 455/435.2 |
| 2006/0200258 | A1 | * | 9/2006 | Hoffberg et al. ............ 700/86 |
| 2010/0157864 | A1 | * | 6/2010 | Salomone et al. ............ 370/311 |

OTHER PUBLICATIONS

US 5,826,194, 10/1998, Westerlage et al. (withdrawn).

* cited by examiner

*Primary Examiner* — George Eng
*Assistant Examiner* — Inder Mehra
(74) *Attorney, Agent, or Firm* — Novak Druce Connolly Bove + Quigg LLP

(57) ABSTRACT

A method of scanning frequencies for registration onto a wireless service provider by a wireless device is provided. The inventive method comprises predefining a priority sequence of frequencies in association with each of a plurality of locations. Itinerary information is received and a current expected location of the device in real-time based is determined based on the itinerary information. The device then scans frequencies according to any priority sequence predefined for the current expected location.

16 Claims, 4 Drawing Sheets

METHOD FOR SCANNING WIRELESS FREQUENCIES

CROSS-REFERENCE TO RELATED APPLICATIONS

This application is a continuation of application Ser. No. 11/083,477, filed on Mar. 18, 2005 now U.S. Pat. No. 7,509,125, entitled "A METHOD OF SCANNING WIRELESS FREQUENCIES", the contents of which are herein incorporated by reference.

FIELD OF THE INVENTION

This invention relates to the field of telecommunications and specifically to wireless devices coupled to communicate with wireless network systems.

BACKGROUND OF THE INVENTION

The use of wireless or mobile communication devices has increased greatly in recent years. Mobile and cellular telephones have enabled mobile station users to roam over large geographic areas while maintaining immediate access to telephony services. Mobile stations include portable units, units installed in vehicles and fixed subscriber stations. Mobile stations comprising cellular telephones or wireless handsets are operable in cooperation with cellular, GSM and/or Personal Communications Services (PCS) communications systems among others. Cellular communication systems (wireless carriers) typically provide service to a geographic market area by dividing the area into many smaller areas or cells. Each cell is serviced by a radio transceiver (i.e., a transmitter-receiver base station or cell site). The cell sites or base stations may be connected to Mobile Telephone Switching Offices (MTSOs) or Mobile Switching Centers (MSCs) through landlines or other communication links, and the MTSOs may, in turn, be connected via landlines to the Public Switched Telephone Network (PSTN).

In a multi-service-provider wireless communication environment, such as a cellular network, multiple service providers or carriers may operate in a given geographic area, for example, a metropolitan area. Each carrier will have its own "geographic network" in that area, and will be assigned a unique operational "frequency" or "channel" (which may comprise multiple frequencies or a band of frequencies) for that geographic area. The service providers may have other geographic networks in other geographic areas. However, in those other geographic areas the service providers may be assigned different frequencies. Furthermore, cellular services in different parts of the world operate on different frequency bands. For example, North American cellular wireless networks typically operate in the 824 MHz to 894 MHz frequency band (often referred to as the 850 MHz band) as well as the 1850 MHz to 1990 MHz frequency band (often referred to as the 1900 MHz band). By contrast, Europe and Asia use the 900 Mhz and 1800 Mhz frequency bands.

When a mobile device, such as a GSM device, is taken to a different country, the device will attempt to locate its home network and will likely fail. The device will then scan for other networks that it is able to detect. Typically, frequency scanning when unable to locate the home network often requires a significant amount of time and can consume a significant amount of power, usually from the mobile device's battery.

Further, it is often preferable to scan for particular carrier frequencies when outside of the home network since different carriers have preferred arrangements with other carriers. U.S. Pat. No. 6,397,064 to Bridges et al. describes an intelligent roaming system with over the air programming. Bridges et al. teaches a system comprising a database, a generator and a data providing device. The database stores preferred wireless carrier identities for a plurality of market areas. The generator generates a list of preferred wireless carrier identities and the list is transmitted to the wireless device by the data providing device.

U.S. Pat. No. 6,223,042 to Raffel provides a method of intelligent roaming using network information. Raffel teaches a wireless device using a search schedule that has been optimized using network information, such as the last location of the device. The search schedule can then be optimized by predicting the next location of the device.

U.S. Pat. No. 6,564,055 to Hronek teaches updating an intelligent roaming database (IRDB). Hronek discloses a method and apparatus to maintain different IRDBs or preferred roaming lists in a mobile handset. A wireless carrier code list is selected based on an individualized aspect of the device such as location or time of day. Movement of the wireless device to a new location may trigger a download of an updated roaming list.

A solution or an improved solution to one or more of the above problems is desired.

SUMMARY OF THE INVENTION

According to one broad aspect of the invention, there is provided a method of scanning frequencies for registration onto a wireless service provider by a wireless device comprising predefining a priority sequence of frequencies in association with each of a plurality of locations, receiving itinerary information, determining a current expected location of the device in real-time based on the itinerary information and scanning frequencies according to any priority sequence predefined for the current expected location.

Preferably, determining the current expected location of the device is performed at power-up of the device.

Also preferably the itinerary information comprises travel information that is updated in real-time wirelessly.

According to another aspect of the invention, there is provided a computer readable memory storing statements and instructions for use in the execution in a computer of the methods of the invention. The computer readable memory is preferably located in a personal data assistant or a server.

According to another aspect of the invention, there is provided a data carrier product containing sequences of instructions which when executed causes the performance of the methods of the invention.

According to another aspect of the invention, there is provided a software product containing sequences of instructions which when executed causes the performance of the methods of the invention.

According to another aspect of the invention, there is provided an integrated circuit product containing sequences of instructions which when executed causes the performance of the methods of the invention.

BRIEF DESCRIPTION OF THE DRAWINGS

Embodiments of the invention may best be understood by referring to the following description and accompanying drawings. In the description and drawings, like numerals refer to like structures or processes. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention.

Method. Generally, in accordance with an aspect of the invention, there is provided methods of scanning frequencies for registration onto a wireless service provider by a wireless device.

Figure 1:
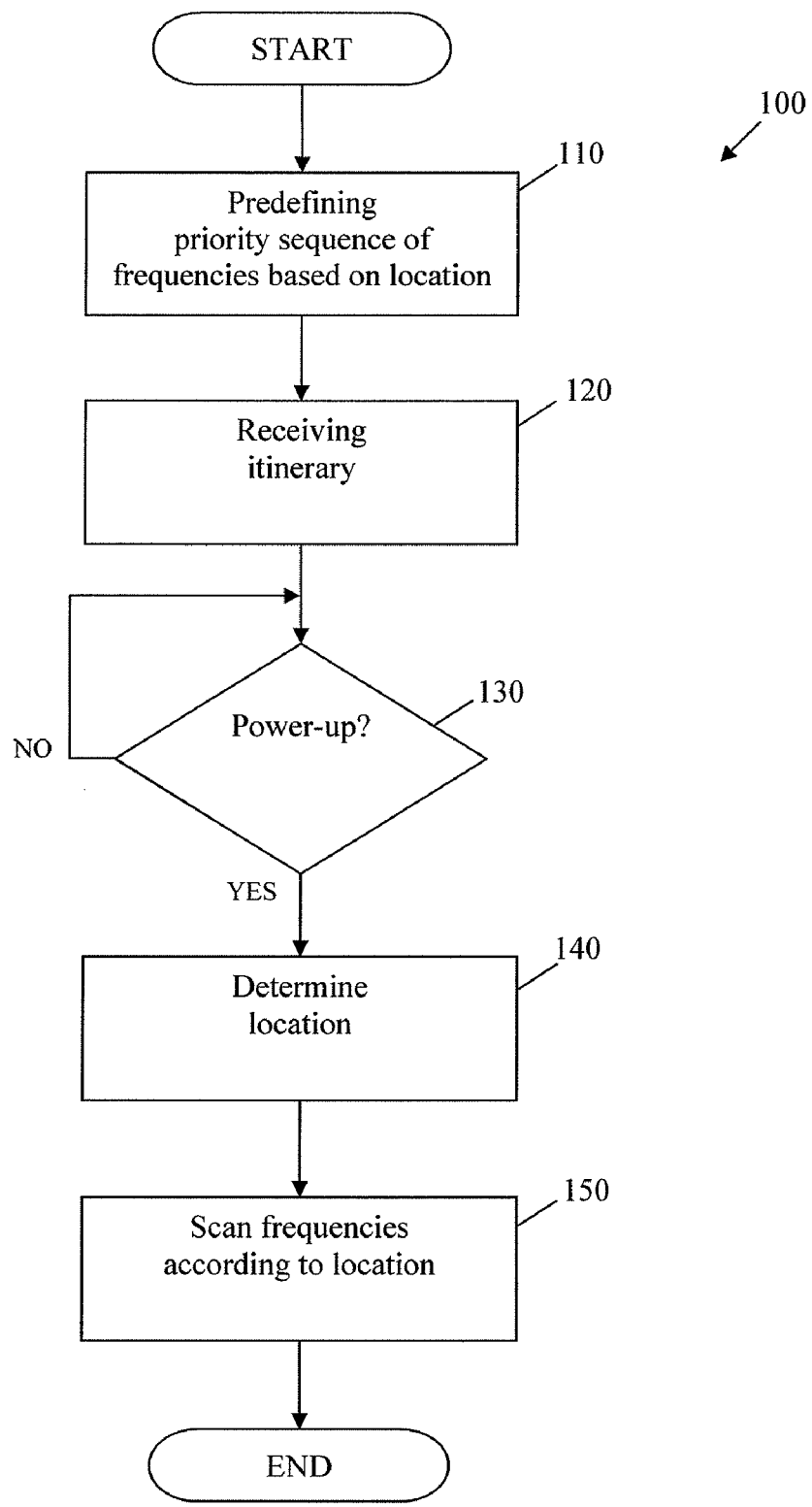
FIG. 1 is a flowchart illustrating operations for scanning frequencies for registration onto a wireless service provider by a wireless device according to a first embodiment of the invention.

Referring to FIG. 1, operations 100 for the scanning frequencies for registration onto a wireless service provider by a wireless device according to a first embodiment of this aspect of the invention are provided. At step 110, priority sequences of carrier frequencies are predefined based on location. For example, with respect to a GSM device, a sequence of carrier frequencies would be predefined for preferably every location in the world capable of providing GSM service. Location may be defined by city, state/province, region, country . . . etc. Therefore, a priority sequence of carrier frequencies for London, England would comprise only carrier frequencies that operate in England, at present, typically within both the 900 Mhz and 1800 Mhz band for GSM devices. Out of those carrier frequencies within the 900 Mhz and 1800 Mhz bands, carrier frequencies may be deemed more preferable would correspondingly have a higher priority in the sequence, for example, those frequencies used by carriers or subscribers that have an advantageous partnering agreement with a user's home network. The priority sequence of carrier frequencies is typically predefined by a user's home carrier and downloaded to the user's mobile device, although it is also possible for a user to predefine the priority sequence or modify a predefined priority sequence.

Figure 3:
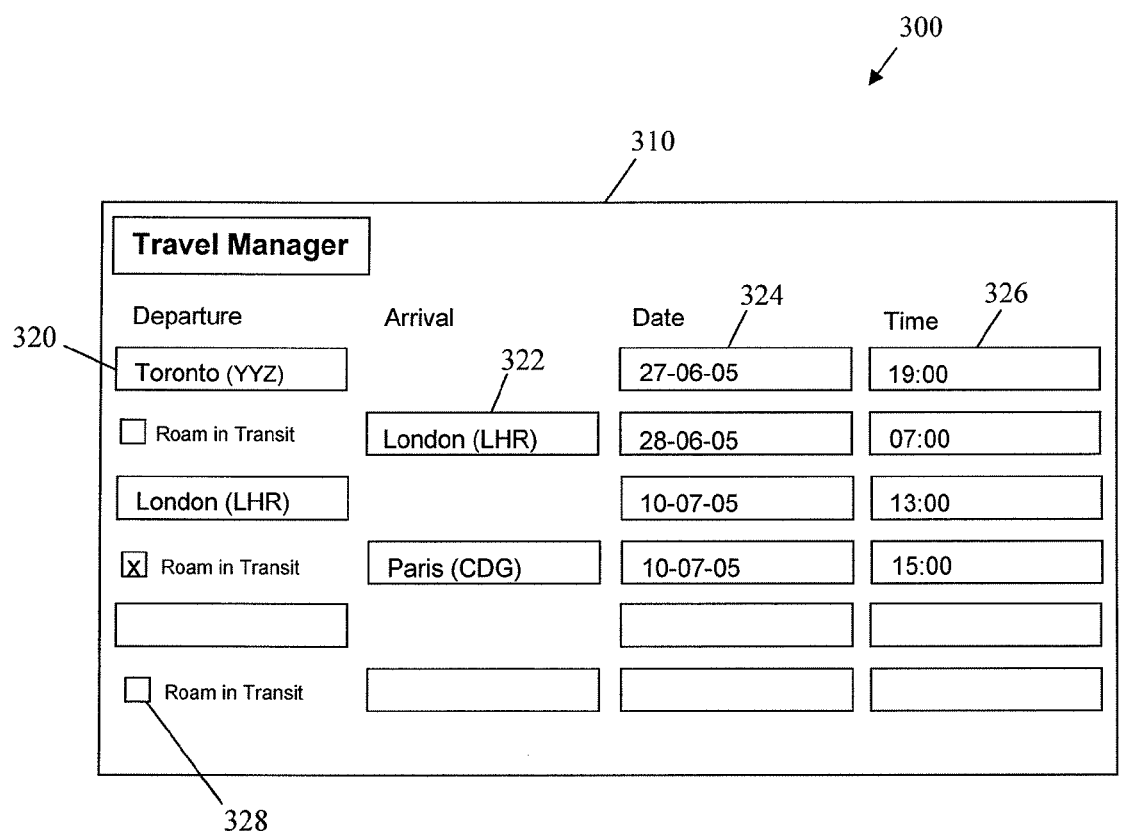
FIG. 3 illustrates a graphical user interface for inputting an itinerary according to the first embodiment of the invention.

At step 120, a travel itinerary is received. The itinerary information is typically inputted by a user. The itinerary information comprises at least one location of the device at a date and time. Preferably, the at least one location is outside of the device's home network. Referring to FIG. 3, a graphical user interface (GUI) 310 is shown for entering an itinerary which is partially filled in. The GUI comprises departure fields 320, arrival fields 322, date fields 324, time fields 326 and a "roam in transit" checkbox. For example, if the user is a resident of Toronto, Canada and will travel to London, England and then on to Paris France, the user would enter his/her travel information into GUI 310 as illustrated. Departure and arrival locations are entered into departure fields 320 and arrival fields 322 respectively. Arrival and departure dates are entered into date fields 324. Arrival and departure times are entered into time fields 326. Preferably, once an itinerary has been received by the mobile device, the device then downloads the priority sequence of carrier frequencies for those locations entered into the itinerary, since to store all possible priority sequences for all possible locations on the wireless device itself would likely require a significant amount of memory.

The itinerary information is preferably received directly through a GUI on the wireless device but the GUI could also be accessible on the World Wide Web via the Internet. Alternatively, a user could call or e-mail in the itinerary information and have it be entered on a server side application at the home service provider. The itinerary information would be then received by download to the wireless device. It will be understood by a skilled worker that a user may use any number of interfaces known in the art to input an itinerary which is then received or downloaded by the wireless device.

If the device is powered-up at step 130, at step 140, a current expected location of the wireless device is determined based on the itinerary information. Power-up could include a general power-up of the device or the activation of the device's communication subsystem (i.e. antenna). At power-up, the device determines whether the current date and time, for example, according the device's internal clock, is during a period during which the user has indicated that he would be outside of his home network according to the itinerary. Therefore, in respect of the itinerary illustrated in FIG. 3, if the device is powered up on Jun. 30, 2005 at 00:00, the device would determine that according to the current date, current time and the itinerary, the current expected location of the device is London, England.

Although step 140 is preferably performed only following power-up at step 130, a skilled worker would understand that the determination may also be made whenever the device loses wireless signal, at the direction of the user or dynamically. Alternatively, the determination at step 140 could be performed following the trigger of an itinerary alarm by the current date and current time. For example, referring to the example itinerary in FIG. 3, at 07:00 on Jun. 28, 2005, an itinerary alarm could be triggered which would alert the device to perform step 140 to determine the current expected location.

At step 150, the device scans for carrier frequencies according to the priority sequence defined for the current expected location. Therefore, in respect of the above example, after the device has determined that the current expected location is London, England according to the current date, current time and itinerary, the device begins scanning carrier frequencies according to the priority sequence predefined in step 110. As the predefined priority sequence of carrier frequencies only includes European GSM frequencies and more particularly those used by preferred English carriers, chances of the device registering onto an acceptable carrier more quickly are improved. Correspondingly, quicker registration onto an acceptable carrier uses less battery power.

Figure 2:
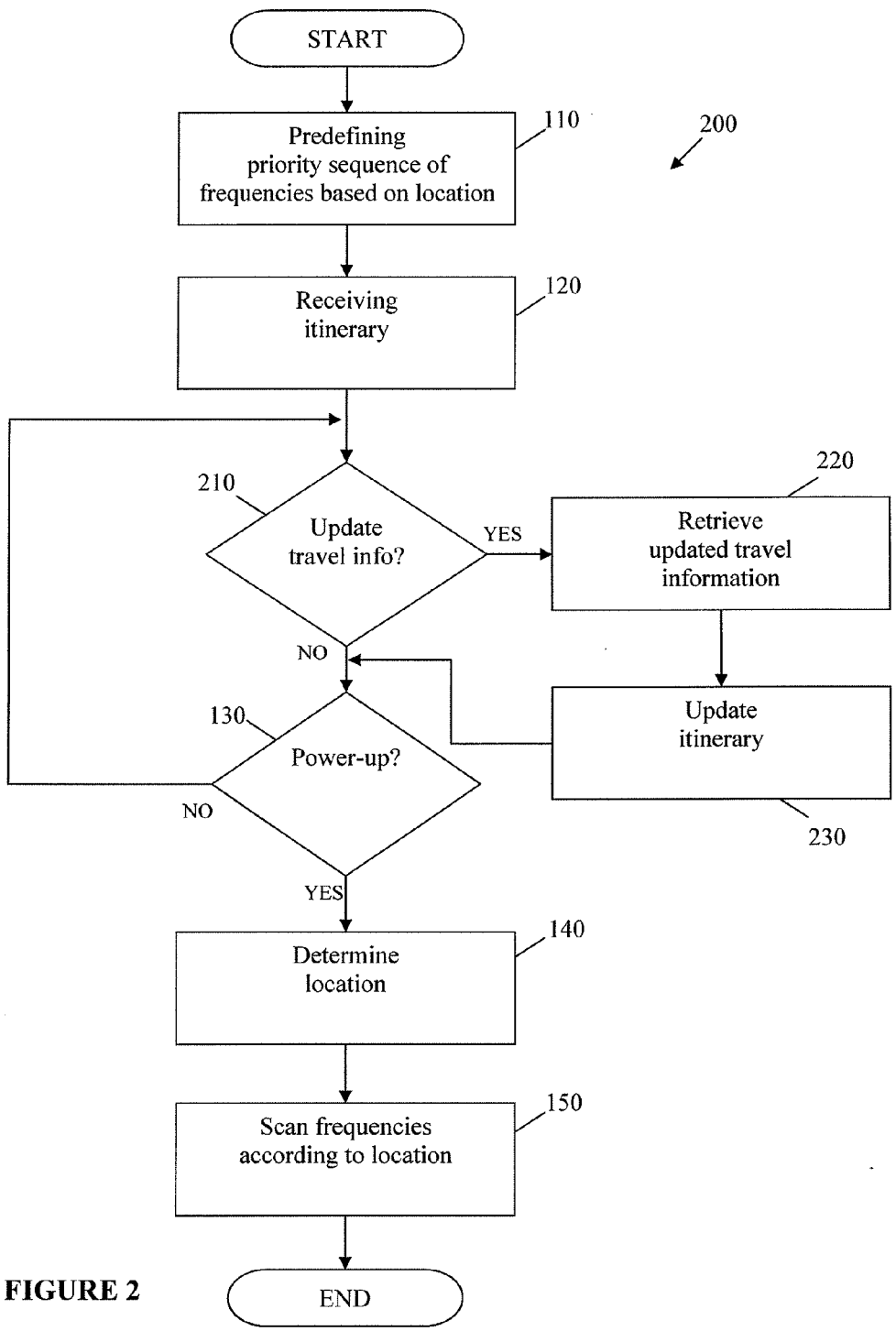
FIG. 2 is a flowchart illustrating operations for scanning frequencies for registration onto a wireless service provider by a wireless device according to a second embodiment of the invention.

The invention will now be described with respect to a second embodiment of the invention. Referring to FIG. 2, operations 200 are provided according to the second embodiment of the invention. Additional steps 210, 220 and 230 are provided. In this embodiment, the itinerary information received at step 120 comprises specific travel information such as, for example, flight numbers, flight times and estimated flying times. If it is determined that the travel information is to be updated at step 210, then operations 200 will proceed to retrieve updated travel information, if available, at step 220. Updated travel information is preferably retrieved wirelessly through a network with which the device is coupled to communicate.

At step 230, the itinerary is updated with the updated travel information. A more accurate itinerary therefore allows for more accurate timing as to when the device would determine that it is outside of a home network and should scan for carrier frequencies according to a priority sequence for a new location. For example, if the user inputs a flight number or a train number into the itinerary, then the device could update the itinerary with any changes to the flight or train information, such as, for example, if the flight is delayed.

In another embodiment of the invention, a user may choose to roam while in transit. Referring to FIG. 3, a user may choose to check "roam in transit" checkbox 328. In this embodiment, the device maps a route from the departure point to the arrival point and approximates the time at which the device would be at various destinations along the route. For example, if a user were travelling from Paris, France to Berlin, Germany by train, the device may be adapted to download the train route as well as the estimated date and time at various intermediate destinations along the route, preferably according to the schedule of stops along the route. Therefore, if this option is chosen, the device may be configured to automatically generate a sub-itinerary comprising departure and arrival dates and times for various intermediate locations along the route. The device is then capable of scanning frequencies pursuant to priority sequences for the locations along the route, preferably when losing signal from country to country and the device is required to rescan for preferable frequencies. Similarly, the roam in transit option can be used when travelling by air. For example, a traveler may turn off the device prior to boarding a flight from Toronto, Canada to Hong Kong, the device may download the flight schedule which contains a stop over in Anchorage, Ak. Therefore, if the device is powered up during the stop-over, it will scan frequencies according to priority sequences defined for Anchorage, Ak.

Figure 4:
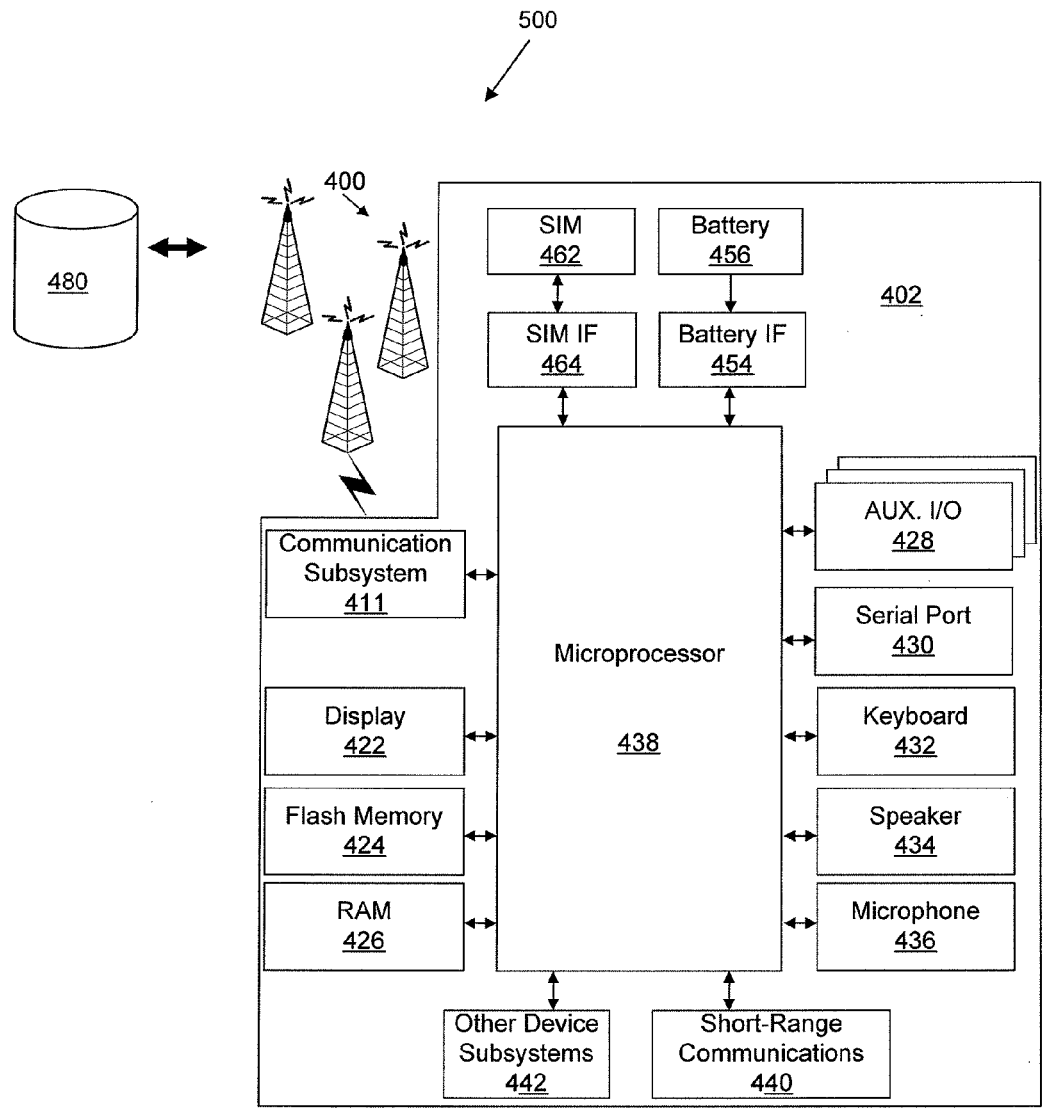
FIG. 4 shows a mobile electronic device having a computer readable memory storing statements and instructions for use in the execution by a microprocessor of the methods of the invention.

Device and Memory. Referring to FIG. 4, a mobile electronic device 402 in system 500 is shown. The mobile electronic device 402 is preferably a two-way communication device having at least voice and advanced data communication capabilities, including the capability to communicate with other computer systems. Depending on the functionality provided by mobile electronic device 402, it may be referred to as a data messaging device, a two-way pager, a cellular telephone with data messaging capabilities, a wireless Internet appliance, or a data communication device (with or without telephony capabilities). Mobile electronic device 402 may communicate via a network 400, in this embodiment, any one of a plurality of transceiver stations.

Mobile electronic device 402 will normally incorporate a communication subsystem 411, which includes a receiver, a transmitter, and associated components, such as one or more (preferably embedded or internal) antenna elements and, local oscillators (LOs), and a processing module such as a digital signal processor (DSP) (all not shown). As will be apparent to those skilled in field of communications, particular design of communication subsystem 411 depends on the communication network in which mobile electronic device 402 is intended to operate.

Network access is associated with a subscriber or user of mobile electronic device 402 and therefore mobile electronic device 402 requires a Subscriber Identity Module or "SIM" card 462 to be inserted in a SIM IF 464 in order to operate in the network. Mobile electronic device 202 is a battery-powered device so it also includes a battery IF 454 for receiving one or more rechargeable batteries 456. Such a battery 456 provides electrical power to most if not all electrical circuitry in mobile electronic device 402, and battery IF 454 provides for a mechanical and electrical connection for it. The battery IF 454 is coupled to a regulator (not shown) which provides power V+ to all of the circuitry.

Mobile electronic device 402 includes a controller such as a microprocessor 438 which controls overall operation of mobile electronic device 402. Communication functions, including at least data and voice communications, are performed through communication subsystem 411. Microprocessor 438 also interacts with additional device subsystems such as a display 422, a flash memory 424, a random access memory (RAM) 426, auxiliary input/output (I/O) subsystems 428, a serial port 430, a keyboard 432, a speaker 434, a microphone 436, a short-range communications subsystem 440, and any other device subsystems generally designated at 442. Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list. Operating system software used by microprocessor 438 is preferably stored in a persistent store such as flash memory 424, which may alternatively be a read-only memory (ROM) or similar storage element (not shown). Those skilled in the art will appreciate that the operating system, specific device applications, or parts thereof, may be temporarily loaded into a volatile store such as RAM 426.

Microprocessor 438, in addition to its operating system functions, preferably enables execution of software applications on mobile electronic device 402. A predetermined set of applications which control basic device operations, including at least data and voice communication applications, will normally be installed on mobile electronic device 402 during its manufacture. A preferred application that may be loaded onto mobile electronic device 402 may be a personal information manager (PIM) application having the ability to organize and manage data items relating to the user such as, but not limited to, instant messaging (IM), e-mail, calendar events, voice mails, appointments, and task items. The PIM application would be capable of being stored in a persistent store such as flash memory 424, ROM or similar storage element, or in a volatile store such as RAM 426. The PIM application would comprise the statements and instructions corresponding to the methods of the invention, such as operation 100, 200 for use in the execution by Microprocessor 438. Naturally, one or more memory stores are available on mobile electronic device 402 and SIM 462 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile electronic device user's corresponding data items stored and/or associated with a host computer system thereby creating a mirrored host computer on mobile electronic device 402 with respect to such items. This is especially advantageous where the host computer system is the mobile electronic device user's office computer system. Additional applications may also be loaded onto mobile electronic device 402 through network 400, an auxiliary I/O subsystem 428, serial port 430, short-range communications subsystem 440, or any other suitable subsystem 442, and installed by a user in RAM 426 or preferably a non-volatile store (not shown) for execution by microprocessor 438. Such flexibility in application installation increases the functionality of mobile electronic device 402 and may provide enhanced on-device functions, communication-related functions, or both. For example, secure communication applications may enable electronic commerce functions and other such financial transactions to be performed using mobile electronic device 402.

In a data communication mode, a received signal such as a text message, an e-mail message, or web page download will be processed by communication subsystem 411 and input to microprocessor 438. Microprocessor 438 will preferably further process the signal for output to display 422, to auxiliary I/O device 428 or both. A user of mobile electronic device 402 may also compose data items, such as e-mail messages, for example, using keyboard 432 in conjunction with display 422 and possibly auxiliary I/O device 428. Keyboard 432 is preferably a telephone type keypad, full alphanumeric keyboard or full or condensed QWERTY keypad. These composed items may be transmitted over a communication network through communication subsystem 411.

For voice communications, the overall operation of mobile electronic device 402 is substantially similar, except that the received signals would be output to speaker 434 and signals for transmission would be generated by microphone 436. Alternative voice or audio I/O subsystems, such as a voice message recording subsystem, may also be implemented on mobile electronic device 402. Although voice or audio signal output is preferably accomplished primarily through speaker 434, display 422 may also be used to provide an indication of the identity of a calling party, duration of a voice call, or other voice call related information, as some examples.

Serial port 430 in FIG. 4 is normally implemented in a personal digital assistant (PDA)-type communication device for which synchronization with a user's desktop computer is a desirable, albeit optional, component. Serial port 430 enables a user to set preferences through an external device or software application and extends the capabilities of mobile electronic device 402 by providing for information or software downloads to mobile electronic device 402 other than through a wireless communication network. The alternate download path may, for example, be used to load an encryption key onto mobile electronic device 402 through a direct and thus reliable and trusted connection to thereby provide secure device communication.

Short-range communications subsystem 440 of FIG. 4 is an additional optional component which provides for communication between mobile electronic device 402 and different systems or devices, which need not necessarily be similar devices. For example, subsystem 440 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile electronic device 402 is configured for sending and receiving data items and includes a PIM for organizing and managing data items relating to the user such as, but not limited to, instant messaging (IM), e-mail, calendar events, calendar appointments, and task items, etc. By way of example, mobile electronic device 402 is configured for voice (which may include push to talk over cellular (POC)) and data services, voice mail service, e-mail service, SMS and chat services to which the user subscribes. To provide a user-friendly environment to control the operation of mobile electronic device 402, PIM together with the operation system and various software applications resident on the station 402 provides a GUI having a main screen from which to access various services via applications stored on said device or available to it.

Electronic device 402 is coupled to communicate through network 400 to an outside memory 480. Outside memory 480 may be server from which a priority sequence of carrier frequencies for specific locations can be downloaded. Alternatively, outside memory 480 may be server from which flight information or train information may be downloaded, such as, for example, updated schedules and route information.

Data Carrier Product. The sequences of instructions which when executed cause the methods described herein to be performed can be contained in a data carrier product for transmission such as embodied in a carrier wave according to one embodiment of the invention.

Computer Software Product. The sequences of instructions which when executed cause the methods described herein to be performed can be contained in a computer software product according to one embodiment of the invention. This computer software product can be loaded into and run by device 402.

Integrated Circuit Product. The sequences of instructions which when executed cause the methods described herein to be performed can be contained in an integrated circuit product including a coprocessor or memory according to one embodiment of the invention. This integrated circuit product can be installed in device 402.

It will be understood by a skilled worker that although the methods and devices of the present invention are described largely with respect to GSM, the methods and devices of the present invention are not limited thereto. Thus, priority scanning based on a travel or destination itinerary may be modified in known ways by a person skilled in the art to apply to any wireless device coupled to communicate with networks using specific frequencies.

Although preferred embodiments of the invention have been described herein, it will be understood by those skilled in the art that variations may be made thereto without departing from the spirit of the invention or the scope of the appended claims.

The invention claimed is:

1. A method, performed by a wireless device, of scanning frequencies for registration onto a wireless service provider, the method comprising:
   storing a plurality of predefined sequences of frequencies, each predefined sequence being associated with at least one respective location;
   storing itinerary information, the itinerary information including a plurality of scheduled locations of the wireless device, each scheduled location being associated with at least one scheduled date and time, at least one of the scheduled locations being outside of the wireless device's home network;
   determining, using the stored itinerary information, that a current date and time matches one of the scheduled dates and times specified in the itinerary information, and using the scheduled location that is associated with the matched date and time, as specified in the itinerary information, as a current expected location of the wireless device;
   using the current expected location, determining one of the plurality of predefined sequences to use; and
   scanning frequencies according to the determined predefined sequence.

2. The method of claim 1, wherein determining that the current date and time matches one of the scheduled dates and times, and using the scheduled location as the current expected location occurs after any one of: power-up of the device, the device losing wireless signal, a trigger of an itinerary alarm and at the direction of a user.

3. The method of claim 1, wherein determining that the current date and time matches one of the scheduled dates and times is dynamic.

4. The method of claim 1, wherein the itinerary information comprises at least one of arrival time, arrival date, arrival location, departure time, departure date, departure location, travel time, flight number, train number and check-in confirmation.

5. The method of claim 4, comprising retrieving current itinerary information in real-time and in response updating itinerary information.

6. The method of claim 1, wherein the itinerary information is stored in an electronic calendar system.

7. The method of claim 1, comprising predicting a date and time of at least one intermediate location according to the itinerary information.

8. The method of claim 7, wherein the itinerary information is updated with the predicted date and time and the at least one intermediate location.

9. A wireless communications device, comprising:
a communications subsystem;
a processor and memory, the memory including data and instructions to configure the processor to:
store a plurality of predefined sequences of frequencies, each predefined sequence being associated with at least one respective location;
store itinerary information, the itinerary information including a plurality of scheduled locations of the wireless device, each scheduled location being associated with at least one respective scheduled date and time, at least one of the scheduled locations being outside of the wireless device's home network;
determine, using the stored itinerary information, that a current date and time matches one of the scheduled dates and times specified in the itinerary information, and using the scheduled location that is associated with the matched date and time, as specified in the itinerary information, as a current expected location of the wireless device;
using the current expected location, determine one of the plurality of predefined sequences to use; and
scan frequencies according to the determined predefined sequence.

10. The wireless communications device of claim 9, wherein determining that the current date and time matches one of the scheduled dates and times, and using the scheduled location as the current expected location occurs after any one of: power-up of the device, the device losing wireless signal, a trigger of an itinerary alarm and at the direction of a user.

11. The wireless communications device of claim 9, wherein determining that the current date and time matches one of the scheduled dates and times is dynamic.

12. The wireless communications device of claim 9, wherein the itinerary information comprises at least one of arrival time, arrival date, arrival location, departure time, departure date, departure location, travel time, flight number, train number and check-in confirmation.

13. The wireless communications device of claim 12, wherein the processor is further configured to retrieve current itinerary information in real-time and in response update the itinerary information.

14. The wireless communications device of claim 9, wherein the itinerary information is stored in an electronic calendar system.

15. The wireless communication device of claim 9, wherein the processor is further configured to predict a date and time of at least one intermediate location according to the itinerary information.

16. The wireless communication device of claim 15, wherein the itinerary information is updated with the predicted date and time and the at least one intermediate location.

* * * * *